United States Patent [19]

Allen et al.

[11] Patent Number: 4,617,884
[45] Date of Patent: Oct. 21, 1986

[54] TORSIONAL VIBRATION ISOLATOR AND METHOD

[75] Inventors: Charles A. Allen, Rte. 4, Box 332 G, Shelby, N.C. 28150; Van D. Durrett, Shelby, N.C.

[73] Assignee: Charles A. Allen, Spartanburg, S.C.

[21] Appl. No.: 635,044

[22] Filed: Jul. 27, 1984

[51] Int. Cl.⁴ .............................................. F16D 3/78
[52] U.S. Cl. ................................ 123/192 R; 464/93; 464/180; 74/599
[58] Field of Search .................... 123/192 R; 464/180, 464/71, 93, 92; 74/574, 599, 604, 411, 595; 192/106.1; 474/94

[56] References Cited

U.S. PATENT DOCUMENTS 1,701,518  2/1929  Walker ................................ 74/574
4,267,805  5/1981  Schmuck ............................ 464/71

FOREIGN PATENT DOCUMENTS 1460381  1/1977  United Kingdom ............ 123/192 R

Primary Examiner—Craig R. Feinberg
Assistant Examiner—David A. Okonsky
Attorney, Agent, or Firm—Daniel E. McConnell

[57] ABSTRACT

An apparatus and method by which possibly destructive stress of torsional vibration in a rotating crankshaft/flywheel system of a multicylinder internal combustion engine is avoided by effectively isolating the flywheel from the crankshaft for torsional vibration considerations. The flywheel and crankshaft are coupled by a resilient coupling which accommodates angular movement between the components and which has a torsional spring rate which is relatively low compared to the torsional spring rate of a conventional crankshaft/flywheel system. The coupling reduces the natural frequency of torsional vibration of the system to a frequency well below the normal operating range of the engine in terms of revolutions per minute, thereby substantially eliminating the effects of torsional vibration in the normal operating range of the engine.

6 Claims, 4 Drawing Figures

TORSIONAL VIBRATION ISOLATOR AND METHOD

FIELD AND BACKGROUND OF INVENTION

This invention relates to multicylinder internal combustion engines and particularly to such engines having provision for protecting the rotating system formed by a crankshaft and a flywheel from stress otherwise induced by torsional vibration.

It has long been recognized that the crankshaft and flywheel of a multicylinder internal combustion engine form a rotating system which has, because of the moments of inertia and coupling of the components, a natural or resonant frequency of torsional vibration. The pulsating forces applied to a crankshaft as a result of the firing of the cylinders of an engine give rise to such vibration and will, at certain rotational speeds, impose stress which will cause a crankshaft or the bearings supporting the crankshaft to fail.

As is indicated in an important reference in the field of this invention (S.A.E. Paper SP-445 presented by Robert C. Bremer, Jr. at the West Coast International Meeting in Portland, Oregon, Aug. 6-9, 1979), the usual approach in dealing with torsional vibration and stress in the environment of this invention is to analyze a crankshaft/flywheel system as if it were a simple torsional oscillator. In one approach to such an analysis, the movements of inertia of the components are resolved about the crankpin closest to the flywheel and the system is treated as if the pin were a spring connecting the portion of the crankshaft forward of the pin with the flywheel. The system may then be viewed as two masses (the crankshaft and the flywheel) joined by a springy connector (the pin) which has a torsional spring rate which determines the natural frequency of torsional vibration of the system. The system may then be analyzed for harmonic frequencies which fall into the operating range of the engine (in revolutions per minute) or which combine with other frequencies in such a way as to generate stress and possibly become destructive. As such frequencies are found, dampers are designed for mounting on the end of the crankshaft remote from the flywheel for the purpose of damping out or reducing the vibration by dissipating energy.

While such an approach has achieved some success, as evidenced by the commercially produced engines and vehicles which employ this technology, significant difficulty has been encountered in attempting to apply the technology to engines which have a wide range of operating speeds, and therefore encounter a wider range of possibly dangerous operating conditions.

BRIEF DESCRIPTION OF INVENTION

With the foregoing in mind, it is an object of this invention to avoid possibly destructive stress of torsional vibration in a rotating crankshaft/flywheel system by effectively isolating the flywheel from the crankshaft for torsional vibration considerations. In realizing this object of the invention, the flywheel and crankshaft are coupled by a resilient coupling means wich accommodates angular movement between the components and which has a torsional spring rate which is relatively low compared to the torsional spring rate of a conventional crankshaft/flywheel system.

Yet a further object of this invention is to reduce the possibility of damaging stress in an engine having a crankshaft/flywheel system of the type described by reducing the natural frequency of torsional vibration of the system to a frequency well below the normal operating range of the engine in terms of revolutions per minute. In realizing this object of the present invention, the separation of the crankshaft and flywheel by the coupling mentioned hereinabove, and the selection of the spring rate for the coupling, enables selection of the frequency so as to substantially eliminate the effects of torsional vibration in the normal operating range of an engine.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
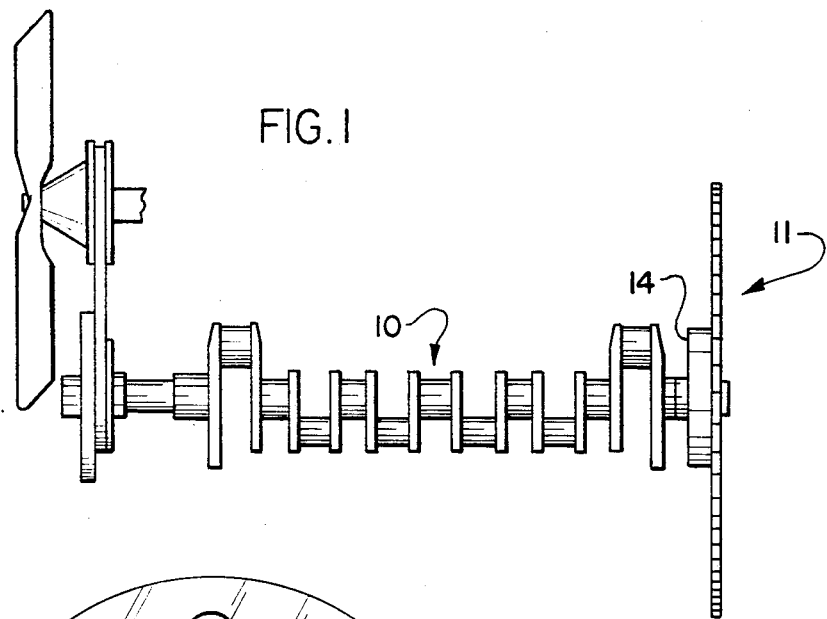
FIG. 1 is an elevation view of components of a multicylinder internal combustion engine and illustrating the present invention.

Referring now more particularly to the accompanying drawings, a multicylinder internal combustion engine has a number of elements which cooperate to enable the engine to operate, as is well known to skilled mechanics. For purposes of simplifying the drawings, only certain elements have been shown or suggested, and it is left to the knowledge of the skilled person to understand the simplification which has been made for purposes of clarity. Those elements of significance to this invention are the crankshaft generally indicated at 10 in FIG. 1 and the flywheel generally indicated at 11. Conventionally, the flywheel is attached to the end of the crankshaft adjacent a clutch, transmission and starter (none of which are shown) and remote from such accessories as a belt driven water pump and fan.

In many conventional engines, and particularly in high performance engines used for such purposes as automotive racing, marine applications and aviation, the flywheel serves few if any useful purposes beyond permitting engagement of the engine with a starter and with a clutch. The more conventional reasons for having a flywheel, relating to providing an inertial mass, are simply irrelevant. However, the problems created by the presence of the inertial mass, and particularly those relating to the effects of torsional vibration, remain. Further, the conventional approach described above and relying on the use of dampers to absorb energy is not capable of avoiding catastrophic failure of engines. The present invention provides an alternative which is successful in such an environment, and is also of more general utility.

Figure 2:
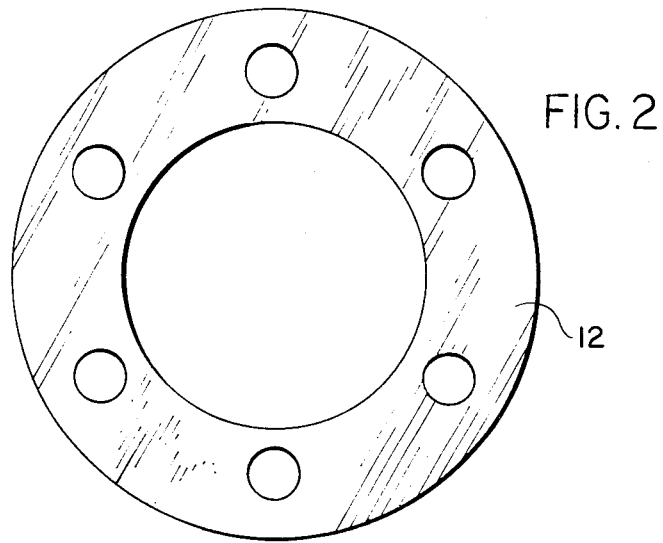
FIG. 2 is an enlarged elevation view of a coupling element used in the apparatus of FIG. 1.
Figure 3:
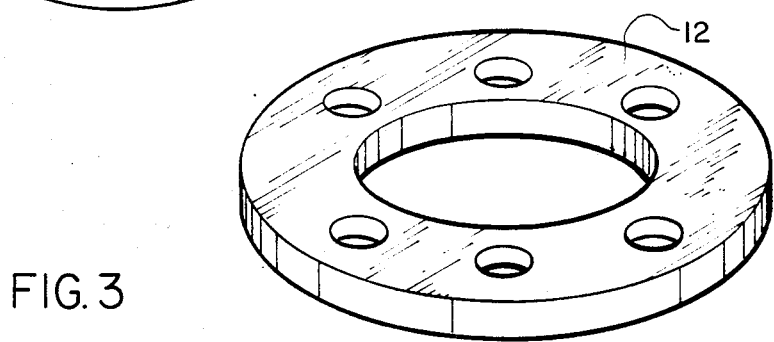
FIG. 3 is a perspective view of the element of FIG. 2.
Figure 4:
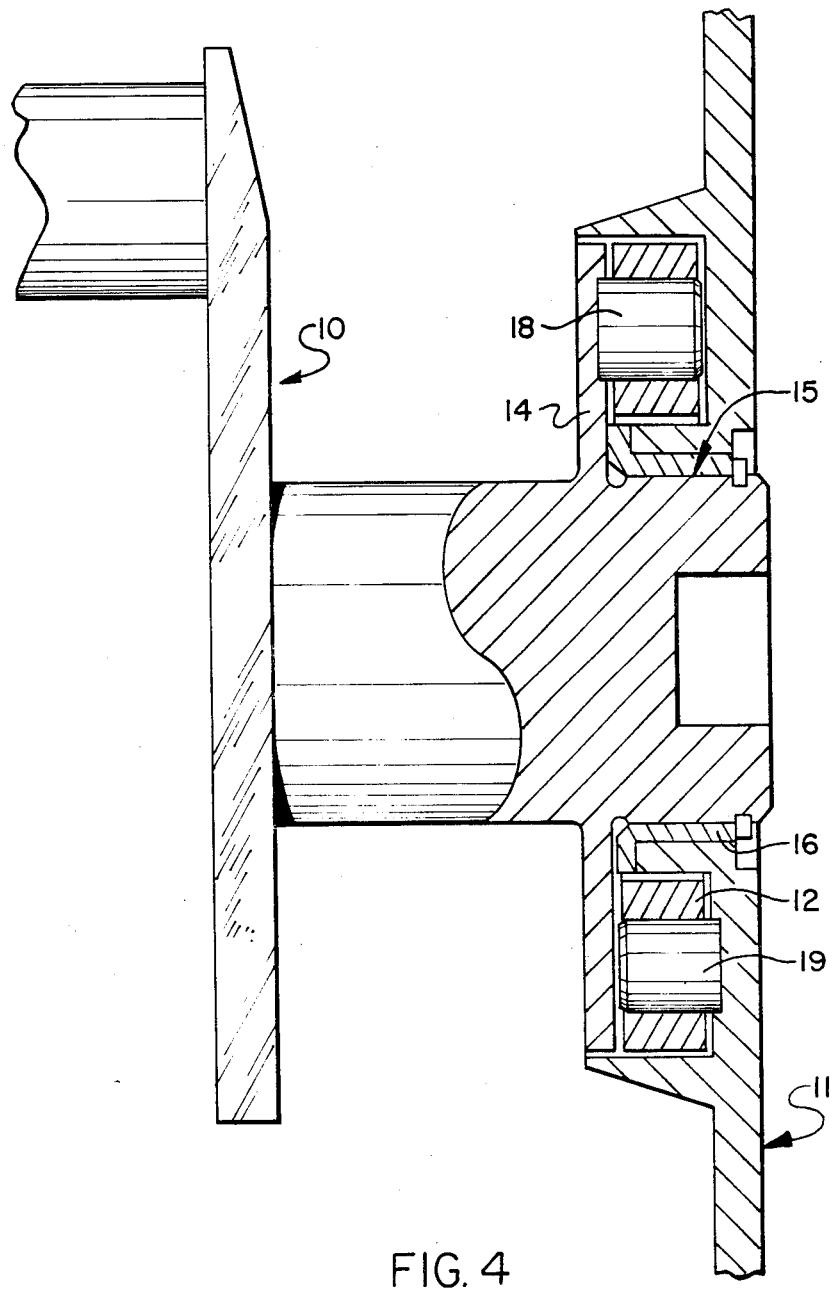
FIG. 4 is an enlarged elevation view, partly in section, of certain of the components of FIG. 1.

More particularly, in a multicylinder internal combustion engine having a rotatable crankshaft 10 and a rotatable flywheel 11, the improvement of this invention facilitates avoiding destructive effects on the crankshaft of stress induced by torsional vibration by providing a resilient coupling means generally indicated at 12 which is interposed between the crankshaft 10 and flywheel 11 (FIGS. 2 through 4) for coupling the crankshaft and flywheel together for rotation of the flywheel with the crankshaft. In accordance with an important feature of this invention, the resilient coupling means has a low torsional spring rate effective for isolating the rotating inertia of the flywheel from the rotating inertia of the crankshaft for purposes of torsional vibration considerations. In particular, the coupling means takes the form of an annulus of resilient material, preferably an elastomer such as rubber, operatively interposed between the crankshaft and flywheel and having a low torsional spring rate effective for reducing the natural frequency of torsional vibration of the rotating system defined by the crankshaft and flywheel to a predetermined low frequency. In one operating embodiment in accordance with this invention, the resilient material annulus has a torsional spring rate of less than 20,000 in-lb/radian and is effective to reduce the natural frequency of torsional vibration of the rotating system defined by the crankshaft and flywheel to a frequency below fifty Hertz.

In order to accomplish coupling of the crankshaft and flywheel, the crankshaft and flywheel are provided with means for permitting coupling thereof while accommodating relative rotation therebetween. The crankshaft 10 has means defining a driving flange 14 and a bearing surface 15, while the flywheel has means defining a bearing 16 for engaging the bearing surface of the crankshaft. Both the crankshaft 10 and flywheel 11 have a plurality of lugs, with the crankshaft having a plurality of driving lugs 18 extending from the driving flange at predetermined locations encircling the axis of rotation of the crankshaft and the flywheel having a plurality of driven lugs 19 extending therefrom at predetermined locations encircling the axis of rotation of the flywheel. The resilient material annulus encircles the bearing surface 15 and the bearing 16 and is enclosed by the driving flange 14 and flywheel 11. The annulus or coupling means 12 has a plurality of openings or holes therein sized to fit snugly onto the lugs 18, 19. Thus, by means of the bearing surface and bearing and the resilient connection established by the coupling means 12, the flywheel and crankshaft are in driving relation one to another while having a substantial degree of relative rotation possible therebetween, against the spring force of the coupling means.

In operation, the coupling means has sufficient rigidity to accommodate starting of the engine by a starter engaging the flywheel and transmission of driving force to a load. However, the coupling means has sufficient resilience that an analysis of the rotating system, for torsional vibration considerations, proceeds on the basis that the inertial mass of the crankshaft taken as a whole is coupled to the inertial mass of the flywheel taken as a whole through a component with a significantly lower torsional spring rate than has heretofore been the case. Thus, as the natural frequency of torsional vibration is a known factor of the moments of inertia of the two masses of a torsional oscillator and the spring rate through which they are coupled (equal to the square root of a value determined by dividing the product of the spring rate times the sum of the moments by the product of the moments), decreasing the spring rate decreases the natural frequency and accomplishes a lowering to a range effectively below the operating range of the engine. For example, a natural frequency below 50 Hertz corresponds to an engine speed below 3000 revolutions per minute, which is below the operating speed of many engines with which this invention finds utility. Conversely, the ability to control the natural frequency of a crankshaft/flywheel system opens the possibility of adapting the teaching of this invention to engines of other types, sizes, and ranges.

In use, the isolation of the flywheel from the crankshaft for torsional vibration considerations, and the arrangement as described hereinabove, permits the flywheel to rotate relative to the crankshaft in such a way that the excursion or angular difference between the rotational positions of those elements may be several degrees, depending upon forces being transmitted and the particular spring constant being used. Such an excursion, in the present invention, is advantageous as assuring that the rotating system is being properly protected from the otherwise possibly adverse effects of torsional vibration, and is not deemed disadvantageous.

In the drawings and specifications there has been set forth a preferred embodiment of the invention and, although specific terms are used, the description thus given uses terminology in a generic and descriptive sense only and not for purposes of limitation.

What is claimed is:

1. In a multicylinder internal combustion engine having a rotatable crankshaft and a rotatable flywheel which together define an inertial system rotating about a predetermined axis of rotation, an improvement which facilitates avoiding destructive effects on the crankshaft of stress induced by torsional vibration and comprising an elastomeric annulus coupling means operatively interposed between the crankshaft and flywheel for coupling the crankshaft and flywheel together for rotation of the flywheel with the crankshaft, said coupling means having a torsional spring rate of less than 20,000 in-lb/radian effective to permit substantial angular displacement between the flywheel and the crankshaft for isolating the rotating inertia of the flywheel from the rotating inertia of the crankshaft after engine startup for purposes of avoiding dampening while preventing torsional vibration from being transferred between the flywheel and the crankshaft.

2. In a multicylinder internal combustion engine having a rotatable crankshaft and a rotatable flywheel which together define an inertial system rotating about a predetermined axis of rotation, an improvement which facilitates avoiding destructive effects on the crankshaft of stress induced by torsional vibration and comprising an elastomeric annulus coupling means operatively interposed between the crankshaft and flywheel for coupling the crankshaft and flywheel together for rotation of the flywheel with the crankshaft, said coupling means being effective to permit substantial angular displacement between the flywheel and the crankshaft for isolating the rotating inertia of the flywheel from the rotating inertia of the crankshaft after engine start up for purposes of avoiding dampening while preventing torsional vibration from being transferred between the flywheel and the crankshaft, said coupling means having a low torsional spring rate effective for reducing the natural frequency of torsional vibration of the rotating system defined by the crankshaft and flywheel to a predetermined low frequency below fifty Hertz.

3. In a multicylinder internal combustion engine having a rotatable crankshaft and a rotatable flywheel which together define an inertial system rotating about a predetermined axis of rotation and subject to torsional vibration, an improvement which facilitates avoiding destructive effects on the crankshaft of stress induced by torsional vibration and comprising said crankshaft having means defining a driving flange and a bearing surface, said flywheel having means defining a bearing for engaging the bearing surface of the crankshaft, and resilient coupling means comprising an annulus of resilient material operatively axially interposed between the crankshaft and flywheel for coupling the crankshaft and flywheel together for rotation of the flywheel with the crankshaft, said resilient coupling means encircling the bearing surface and the bearing and enclosed by the driving flange and flywheel and having a low torsional spring rate effective for isolating the rotating inertia of the flywheel from the rotating inertia of the crankshaft for purposes of torsional vibration considerations and further wherein the crankshaft has a plurality of driving lugs extending parallel to said axis of rotation from the driving flange at predetermined locations encircling said axis of rotation for engaging said resilient material annulus and the flywheel has a plurality of driven lugs extending therefrom parallel to said axis of rotation at predetermined locations encircling said axis of rotation and non-aligned with said driving lugs for engagement with said resilient material annulus.

4. In a multicylinder internal combustion engine having a rotatable crankshaft and a rotatable flywheel which together define an inertial system rotating about a predetermined axis of rotation and subject to torsional vibration, an improvement which facilitates avoiding destructive effects on the crankshaft of stress induced by torsional vibration and comprising the crankshaft having means defining a driving flange and a bearing surface and a plurality of driving lugs extending parallel to said axis of rotation from the driving flange at predetermined locations encircling said axis of rotation, the flywheel having means defining a bearing for engaging the bearing surface of the crankshaft and a plurality of driven lugs extending parallel to said axis of rotation from the flywheel at predetermined locations encircling the axis of rotation of the flywheel and non-aligned with said driving lugs, and an annulus of elastomeric material operatively interposed axially between the crankshaft and flywheel and engaging said driving and driven lugs for coupling the crankshaft and flywheel together for rotation of the flywheel with the crankshaft, said elastomeric material annulus having a torsional spring rate of less than 20,000 in-lb/radian and being effective for reducing the natural frequency of torsional vibration of the rotating system defined by the crankshaft and flywheel to a predetermined low frequency below fifty Hertz.

5. A method of protecting the components of a multicylinder internal combustion engine having a rotatable crankshaft and a rotatable flywheel against destructive effects on the crankshaft of stress induced by torsional vibration and comprising the steps of mounting the flywheel for rotation relative to the crankshaft, and interconnecting the crankshaft and flywheel with a resilient material annulus which has a torsional spring rate of less than 20,000 in-lb/radian which joins the crankshaft and flywheel together for rotation of the flywheel with the crankshaft, the annulus being effective to permit substantial angular displacement between the flywheel and the crankshaft after engine start up while isolating the rotating inertia of the flywheel from the rotating inertia of the crankshaft for purposes of avoiding dampening while preventing torsional vibration from being transferred between the flywheel and the crankshaft.

6. A method of protecting the components of a multicylinder internal combustion engine having a rotatable crankshaft and a rotatable flywheel against destructive effects on the crankshaft of stress induced by torsional vibration and comprising the steps of mounting the flywheel for rotation relative to the crankshaft, and interconnecting the crankshaft and flywheel with a resilient material annulus which is effective to reduce the natural frequency of torsional vibration of the rotating system defined by the crankshaft and flywheel to a predetermined low frequency below fifty Hertz and which joins the crankshaft and flywheel together for rotation of the flywheel with the crankshaft, said annulus being effective to permit substantial angular displacement between the flywheel and the crankshaft for isolating the rotating inertia of the flywheel from the rotating inertia of the crankshaft after engine start up for purposes of avoiding dampening while preventing torsional vibration from being transferred between the flywheel and the crankshaft.

* * * * *